UNITED STATES PATENT OFFICE.

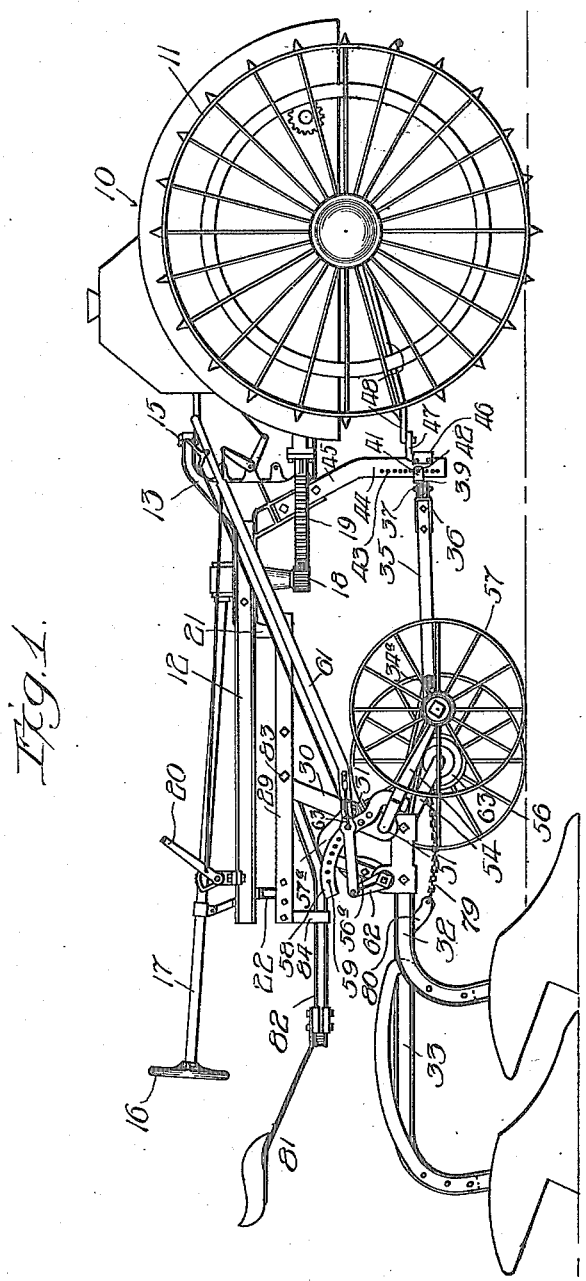

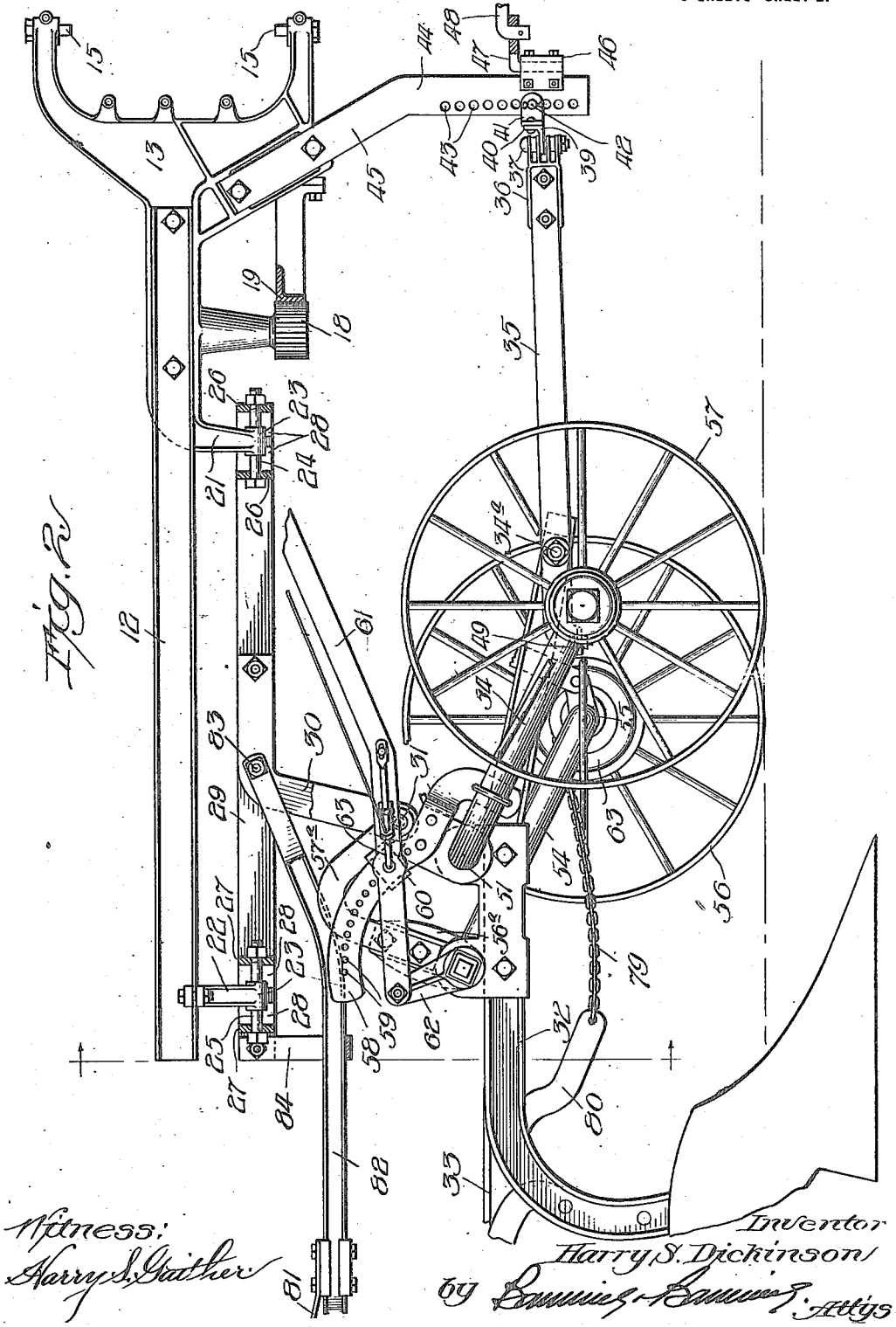

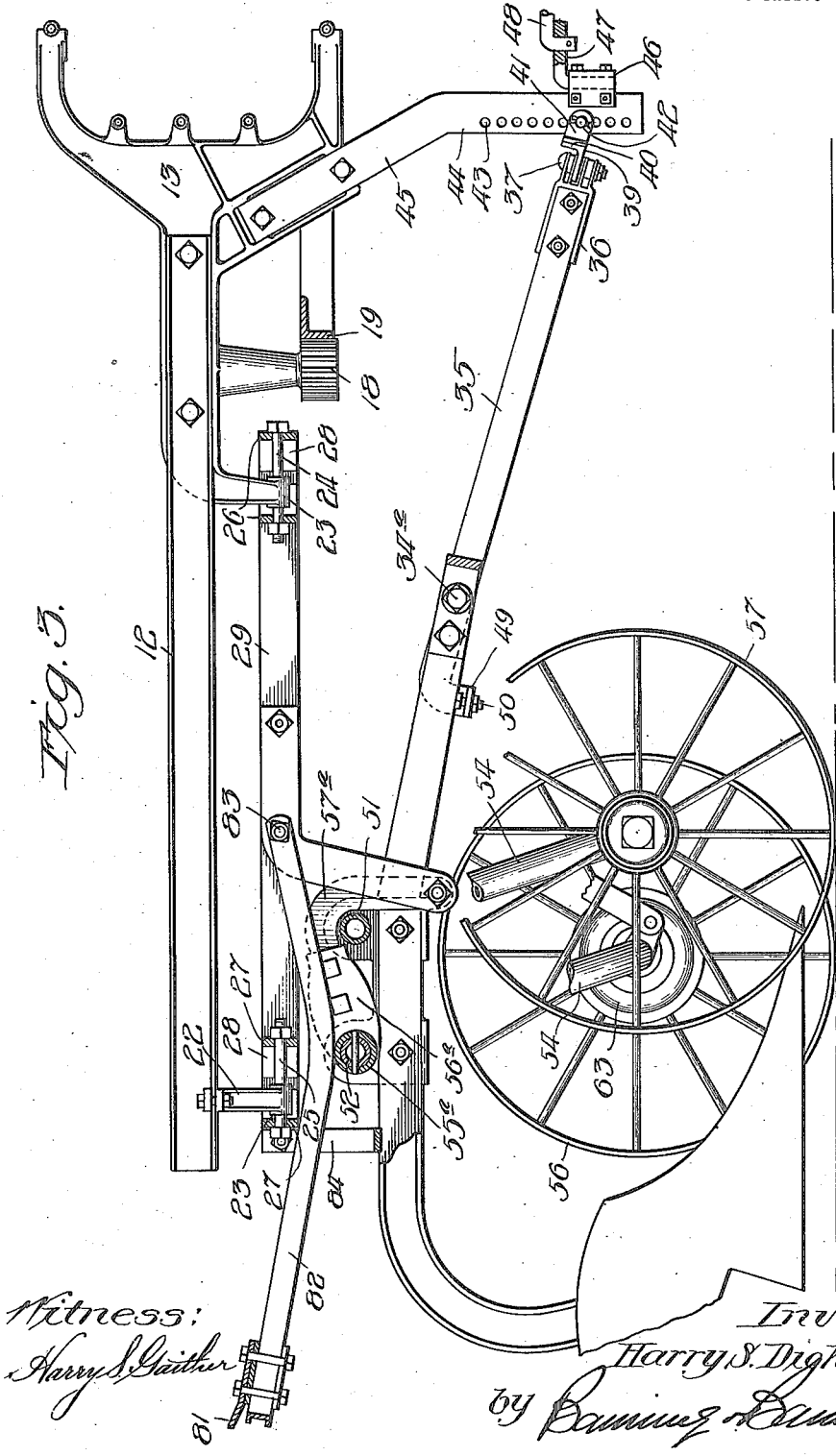

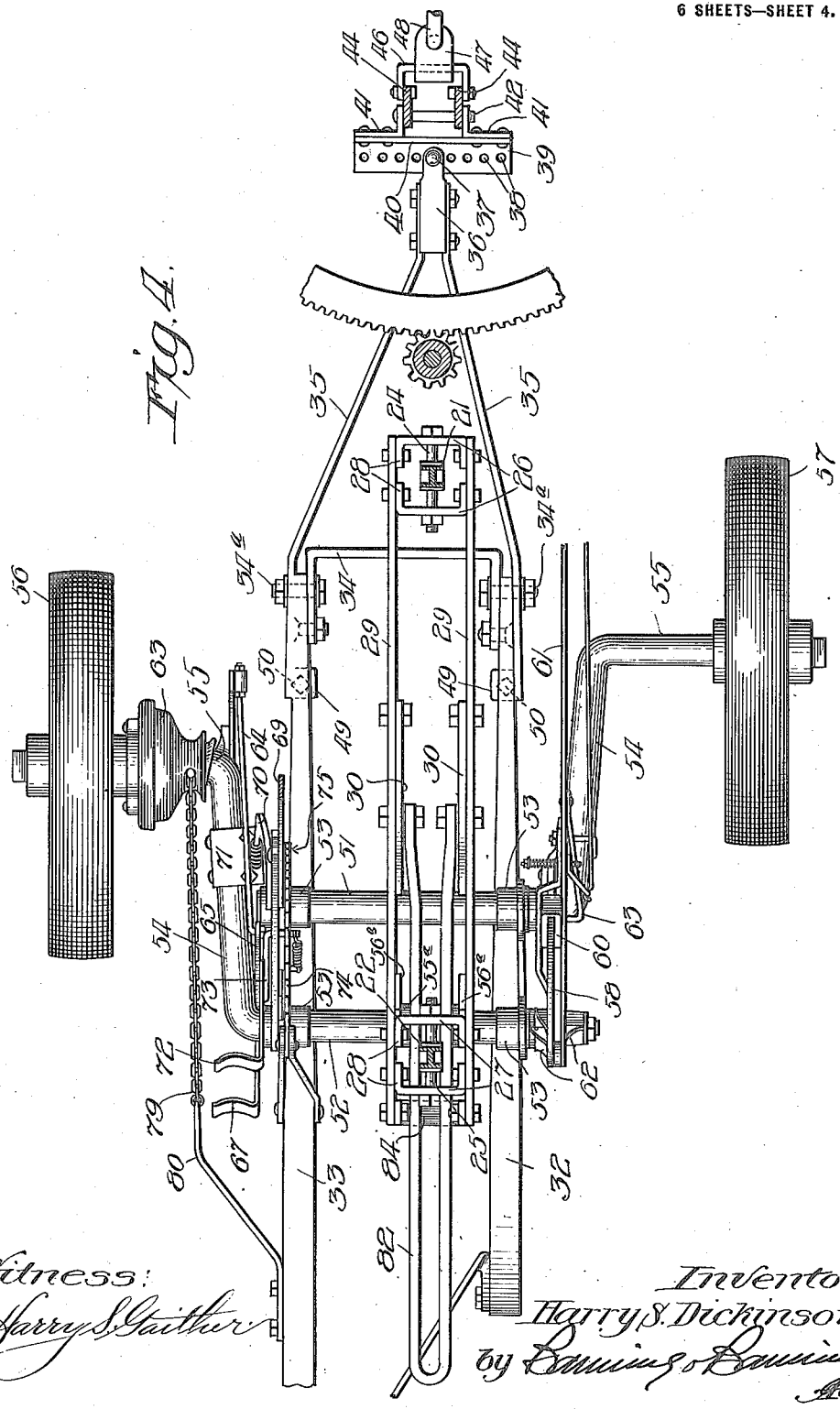

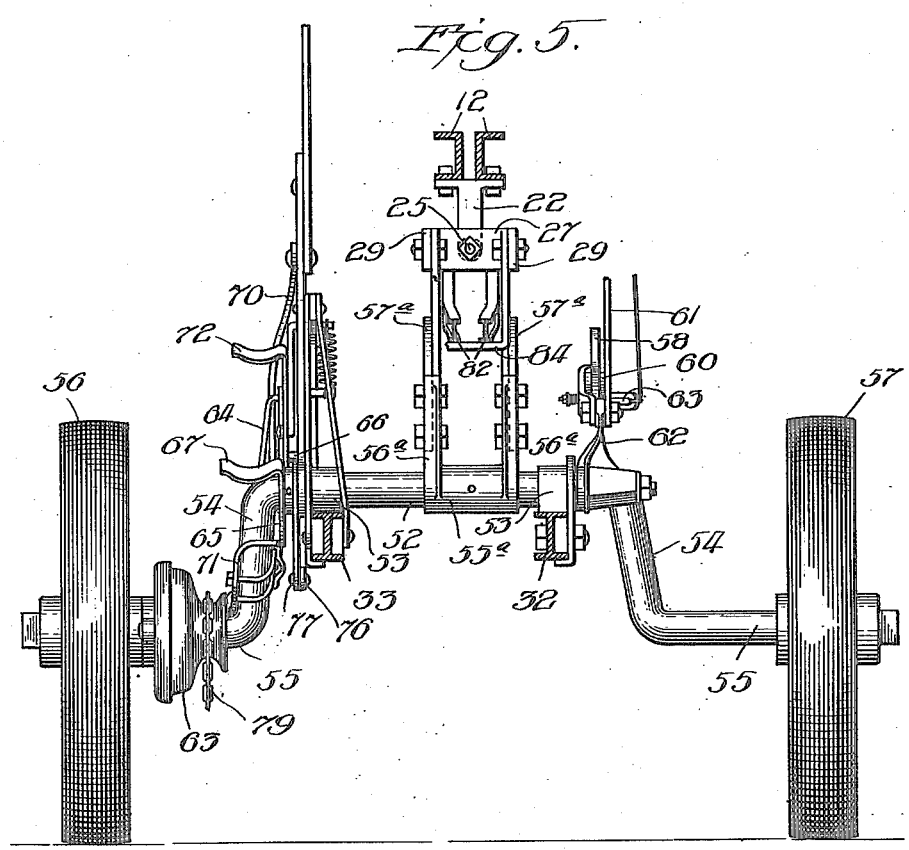

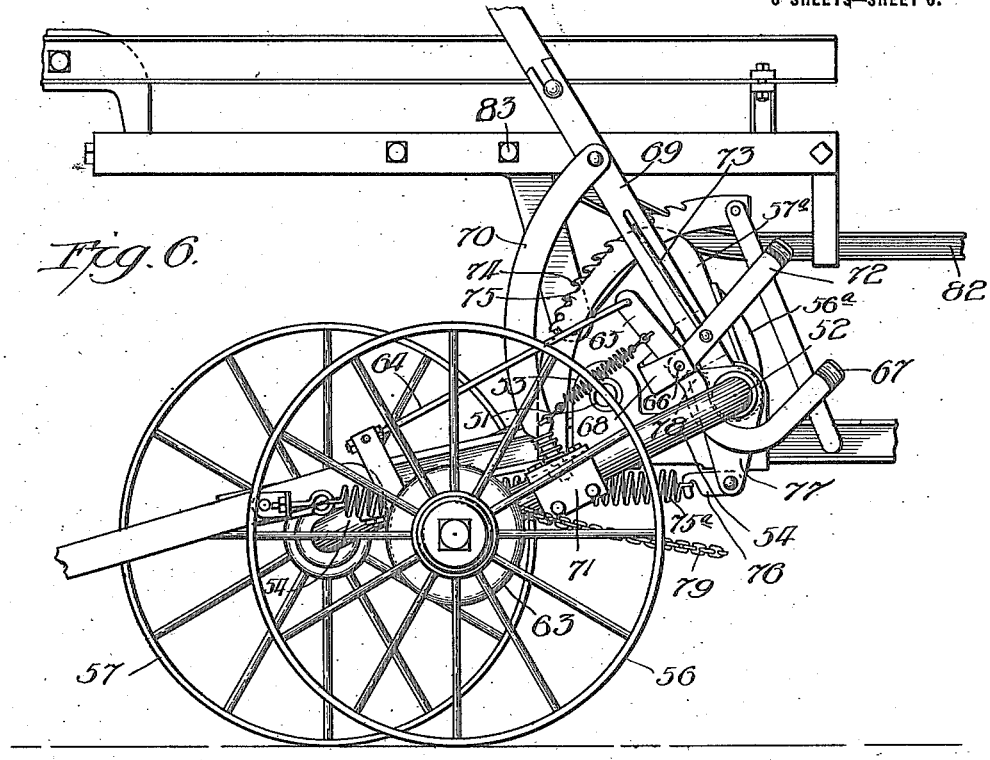
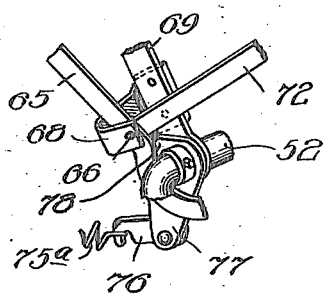

HARRY S. DICKINSON, OF MOLINE, ILLINOIS, ASSIGNOR TO MOLINE PLOW COMPANY, OF MOLINE, ILLINOIS, A CORPORATION OF ILLINOIS.

TRACTOR CONNECTION.

1,257,589.  Specification of Letters Patent.  Patented Feb. 26, 1918.

Application filed July 31, 1916.  Serial No. 112,320.

*To all whom it may concern:*

Be it known that I, HARRY S. DICKINSON, a citizen of the United States, residing at Moline, county of Rock Island, and State of Illinois, have invented certain new and useful Improvements in Tractor Connections, of which the following is a specification.

The present invention relates to certain connections and appliances which are designed with a view of coördinating the movements and adjustments incidental to the use of tractors of the type which rely upon the trailing implement to afford a support for the rear end of the tractor, as distinguished from tractors of the self-contained type, which may be guided and steered independent of the trailing implement.

The tractor, which in the present invention is combined and coördinated with the trailing implement, relies upon the latter to afford the ground support for the power element, and also to afford necessary ground contact for steering the implement as a whole. In fact, the present invention relates primarily to those connecting features which unite the trailer with the power element into a unitary implement.

In designing connections intended for the above purposes, it is essential to the best results that there shall be an adequate coördination of those features which are requisite to a proper guidance and control of the tractor, and at the same time that there shall be sufficient independence in the movement to adapt the trailer, if a ground working implement, to conform itself with sufficient freedom to soil conditions in the immediate proximity of the furrow openers. It is also necessary to afford sufficient flexibility to prevent a wrenching or racking of the implement when traveling through rough ground, and connections which afford this flexibility must conform to the requirements for adjustment of the furrow openers and ground wheels to a degree necessary to enable the implement to perform its intended service.

A further requirement to which the present invention is directed pertains to the necessity for maintaining the power element on an even keel, irrespective of the adjustment of the furrow openers, in order that lubrication may be distributed as equally as possible in the pistons and connected rods, and also to maintain an even gasolene and water level.

The present invention is designed to correct a certain difficulty which has been experienced in the use of an implement of this type, which difficulty was due to the tilting up or down of the tractor frame in conformity with the vertical adjustment of the furrow openers.

The present invention is designed to maintain a proper horizontal level of the power element, irrespective of these adjustments and irrespective of variations in the vertical adjustments of the ground wheels when the furrow wheel of the plow is traveling in a furrow.

The invention, furthermore, relates to the means providing the necessary rigidity of connection to enable the tractor to be reversed, which is an operation very difficut to perform where a trailer is merely hitched to a self-contained tractor by an ordinary articulating joint. In the present instance the ground wheels of the plow not only serve the combined function of affording the usual support for the plowing elements, but also act as guiding wheels for the power element, whether advancing or reversing, which greatly facilitates the freedom of action of the implement as a whole, and affords to the implement a much shorter radius of action than could otherwise be secured.

A further characteristic of the present invention pertains to the facility with which the drawn implement may be connected to and disconnected from the power element, thereby permitting the latter to be readily employed with different implements designed for interchangeable use in conformity with the principles of the present invention.

In the drawings:

Figure 1 is a side elevation of the power element united with a gang plow;

Fig. 2 is a side elevation, partially in section, showing the plow with the ground wheels raised and the furrow openers lowered;

Fig. 3 is a similar view, showing the parts in an intermediate position of adjustment;

Fig. 4 is a top or plan view of the plow and connections;

Fig. 5 is a cross-sectional elevation of the same, which imparts the position shown in Fig. 2;

Fig. 6 is a detail showing the power adjustment for the land wheel and Fig. 7 is a perspective detail of the mechanism for adjusting the land wheel standard.

The connections, which more specially form the subject matter of the present invention, are built into an implement comprising an unstable power unit 10 provided with tractor ground wheels 11, preferably driven by a gasolene engine, but since the special features of construction of this power unit are not essential to an understanding of the invention, they need not be specifically described. The term "unstable" as used in the present connection is intended to define a power-unit preferably in the nature of a two-wheel tractor, which requires the presence of additional ground support in order to maintain it in a proper condition of horizontal equilibrium, as distinguished from a self-sustaining tractor of the three or four wheel type. The power unit has rearwardly extending therefrom a beam 12 which terminates at its forward end in a yoke 13, the upper and lower arms of which are connected to the power unit by means of vertical pivots 15 which permit the beam to turn on a vertical axis, but serve to maintain the beam in a substantially horizontal position. This articulating beam serves as a support for the steering wheel 16 carried by a steering shaft 17, which, through suitable gearings, serves to impart rotation to a pinion 18 meshing with the segmental rack 19 carried by the frame of the power unit.

The center of curvature of the rack is coincident with the vertical axis of the articulated beam, so that by a turning of the steering wheel, the beam can be swung to right and to left in the steering of the implement. Furthermore, it serves as a mounting for suitable controlling levers 20 which operate through suitable connections to control the operation of the power unit. These features form the subject matter of the co-pending application, Serial No. 35,784, and need not be further described in detail.

The articulated beam is preferably formed from spaced sections of angle iron, which are bolted or otherwise secured to the yoke, and the stem of the latter, at its rear end, is bent or turned to provide a depending forward arm 21 which is alined with and coöperates with a similar depending arm 22 which is secured to the beam at or near the rear extremity thereof, as best shown in Fig. 2. Each of the forward and rear depending arms terminates in a journal sleeve 23, which sleeves are alined with one another and are slidably and rotatably pivoted upon forward and rear longitudinal pivot bolts 24 and 25, respectively. The ends of the pivot bolts are entered through pairs of forward and rear spacer brackets 26 and 27, which brackets are of channel formation in plan, as shown in Fig. 4, and have their inturned ends 28 bolted or otherwise secured to a pair of longitudinally extending bars 29, which are in parallel spaced relation with respect to one another and which combined, afford an elongated frame which serves to carry the working portions of the implement, which is connected with and coöperates with the power unit.

The bars comprising the elongated frame have bolted or otherwise secured thereto a pair of depending hangers 30 for the mounting of a main pivot bolt 31 which furnishes an axial center of movement for the implement secured to the power unit.

The features thus far described are intended to afford a connection adapted for use in association with various kinds of implements, but since the present connections are intended primarily for use in association and combination with a special form of gang plow, the main features of the latter will now be described. The gang plow comprises a pair of plow beams 32 and 33 of the usual formation, which carry at their downturned rear ends a pair of plow bottoms of the mold-board type as shown, although the invention is adapted equally for use in connection with disk furrow openers. The plow beams are connected at their forward ends to a cross bar 34, as shown in Fig. 4, and the beams are furthermore pivotally connected through pivot bolts 34ª with a pair of forwardly converging draft bars 35 which unite at their forward ends in a clevis 36, which carries a vertical pivot pin 37 adapted to be inserted through any one of a series of holes 38 in a clevis plate 39. The clevis plate is of angled formation and has secured to its upstanding flange 40 a pair of forwardly extending ears 41, which receive a transverse horizontal pivot 42 which serves to pivot the clevis and associate parts through any pair of the vertical series of holes 43 formed in a pair of vertically disposed draft bars 44, which stand in spaced relation to one another and have their upper ends 45 rearwardly angled and bolted or otherwise secured to the yoke 13 at the forward end of the articulated beam 12. The vertical draft bars at or near their lower ends are connected by means of a cross bracket 46, which carries a short tongue 47 to receive the rear end of the draft rod 48, the end of which is shown in Fig. 2 and which extends forwardly to a suitable point of connection with the frame of the power unit.

The arrangement is one which serves to impart the draft through the clevis and through the two draft bars 35 directly to the plow beams which are afforded thus upward thrust against the lever 69 which assists the driver in the operation of swinging forward the land wheel and lowering the plow beams into the ground. In the initial movement required to effect this operation, when the ground wheel standards are standing vertically or substantially so, and the plow beams are elevated, considerable force is required to accelerate the forward travel of the ground wheels at a speed in excess of the normal speed of the implement, and it is to assist in imparting this initial movement that the spring 75$^a$ is provided. After the standards have been thrown forward into an oblique position, the critical angle is passed and gravity assists in lowering the plow beams and plow bodies to their desired position, the tension of the spring progressively decreasing at a rate commensurate with the increasing action of gravity in securing the adjustment.

The raising of the plow beams is effected by means of the clutch 63 which, when thrown, acts as a drum to wind up a chain 79 which, as shown in Fig. 4, has its rear end anchored to a rod 80 outstanding from the plow beam 33 on the land side. These special features, which are provided for facilitating the raising, lowering, and adjusting of the plow beams and bodies, are not, strictly speaking, to be considered as a part of the present invention, since other mechanism for securing similar results may be provided; but the general features have been described in order that a full understanding of the more essential features of the present invention may be had. The seat mounting, however, bears direct relation to the present invention and affords additional and highly efficient means for assisting in the initial movement of lowering the plow bodies, and these features will now be described.

The seat 81 is mounted upon a beam 82 which is slightly upturned at its forward end and secured by means of a pivot 83 between the parallel bars 29 which compose an elongated supporting frame. When the plow beams and plow bodies are elevated, as shown in Fig. 3, the seat beam will rest upon and be supported by the sleeve 55$^a$ on the land wheel axle. With the driver on the seat at the rear of this point of support, the driver's weight will act powerfully through the lever thus afforded in forcing down the plow beams and in initially thrusting forward the wheel standards into oblique position and until the dead center or the critical angle is passed and until gravity comes into play in the ultimate lowering of the plow beams.

In order, however, that the downward movement of the seat beam and seat may not be extreme, and to arrest this movement when the driver's weight is no longer requisite in the adjustment of the parts, a hanger stirrup 84 is provided which depends from the rear end of the elongated supporting frame, as is well shown in Fig. 2, which stirrup receives and supports the seat beam after the initial movement, thereby permitting the parts which initially sustain the driver's weight to drop away to their ultimate position of adjustment. This arrangement permits of the utilization of the driver's weight for adjusting purposes but without an undue variation in the position of the driver's seat, which would be objectionable in that it would cause inconvenience to the driver in the manipulation of the steering wheel and controlling devices mounted upon the beam 12 extending rearwardly from the power unit.

In operation, with the plow beams and bodies raised as in Fig. 3, the converging draft bars 35 will be swung up or elevated, and the preponderance of weight at the rear ends of the plow beams will cause the latter to rest upon the adjustable stop bolts 50, which maintain the plow beams in substantially horizontal parallelism with the draft bars. With the parts in this position, the wheel standards will stand substantially vertical and the weight of the seat beam will be borne by the land wheel axle.

In order to drop the plow bottoms, the lever 69 will be unlatched and drawn to the rear which serves to rotate the land wheel axle, and thrust forward the standard of the latter into oblique relation, which movement will be assisted by the tension of the spring 75$^a$ and the leverage afforded by the weight of the driver. After the dead center or critical angle has been passed, the plow beams will swing down easily into the soil to the desired depth, and the plowing will begin. This downward movement of the plow beams, however, will be accompanied by a relative upward movement of the angled connecting bars 57$^a$ which act through the main horizontal pivot bolt 31 to maintain the elongated supporting frame and the rearward beam 12 of the power unit in their previous horizontal position, so that the lowering of the plows will not in any way disturb the normal level of the power unit or the normal operation of the engine. In readjusting the parts the driver's seat will be slightly lowered until the movement of the seat beam is arrested by contact with the stirrup, but this movement will be so slight as not to interfere with the convenient operation of the steering wheel and engine controlling levers. This repositioning of the parts results in a down swinging of the forwardly converging draft bars 35 and a slight variation in the longitudinal distance between the power unit and the trailing implement, but this variation is compensated for by affording a sliding connection befreedom of vertical movement in an upward direction about the pivot bolts 34ª as a horizontal axis, but the movement of the plow beams in a downward direction, below a point in substantial alinement with the converging draft bars 35, is prevented by extending the draft bars to the rear a substantial distance beyond the pivotal mounting and inturning their ends to afford stops 49 which underlie the plow beams.

This permits the joint at this point to break in one direction only, so that when the plow beams are lifted from the ground by the mechanism to be hereinafter described, the preponderance of weight at the rear ends of the plow beams will cause the latter to be supported upon the inturned stop lugs, and in order to afford a slight degree of regulation at this point, the lugs are provided with adjustable stop bolts 50, which furnish the actual points of contact for the plow beams, as best shown in Fig. 3, which illustrates the parts in the adjustment above mentioned.

The plow beams afford a mounting for a forward furrow wheel axle 51 and a rear land wheel axle 52, which are journaled to rock within bearings 53. Each of the axles is provided with an angularly disposed leg or standard portion 54 terminating in a spindle 55 upon which the land and furrow wheels 56 and 57, respectively, are journaled, as is usual in plows of this general type. The rear or land wheel axle 52 has pinned or bolted thereto a sleeve 55ª, best shown in Figs. 3 and 5, which sleeve at its end is provided with a pair of socket arms 56ª which receive the rear ends of a companion pair of angled connecting bars 57ª, the outer ends of which extend in right angular relation to the socket arms 56ª and are pivoted to the main pivot bolt 31 which furnishes the pivotal connection between the hangers 30 and the plow now being described.

The relation of these parts is such that when the wheel axles are turned to bring the legs or standards into substantially vertical relation with respect to the plow beams, or, in other words, when the plow beams are elevated from the ground, as shown in Fig. 3, the angled connecting bars 57ª will be turned to their lowermost position with the result that the readjusting of the wheels and the lifting of the plow beams will not affect the horizontal level of the articulated beam extending from the power element, which is of material importance for reasons previously pointed out.

The furrow wheel 57 may be given independent adjustment with respect to the land wheel by means of a mechanism now to be described. The leg or standard for the furrow wheel is provided at its upper end with a rearwardly and upwardly extending curved adjusting bar 58 provided with a series of holes 59. The adjusting bar furnishes a mounting for a rider 60, which is pivotally connected with and carried by a lever 61, the rear end of which is pivoted to a crank arm 62 outwardly extending from the end of the land wheel axle. With the parts in the position shown in Fig. 2, with the furrow wheel raised, the lever 61 may be thrown back, which will cause the rider to travel on the curved adjusting bar and throw the rear end of the latter upwardly until the adjusting bar occupies a position concentric with the pivotal fulcrum of the lever 61.

This movement will swing the leg or standard into a vertical position and throw the furrow wheel down to a level with the plow body, so that the furrow wheels will travel in a previously formed furrow. The parts may be then locked in adjusted position by means of a suitable hand operated latch 63 of any suitable description.

These special features of plow construction are not strictly a part of the present invention, since other means for securing the desired adjustments may be employed with equal advantage.

Fig. 6 illustrates the means employed for adjusting the land wheel and with it the furrow wheel when the two are held in locked relation by the lever mechanism above described. The axle of the land wheel carries a clutch 63 which is operable by means of a controlling rod 64 connected with the upper end of the lever 65 mounted at the center upon a pivot 66 and terminating in a foot treadle 67 within convenient reach of the operator.

The pivot 66 is carried by a U-shaped yoke 68 outstanding from the lower end of a lever 69 mounted upon the axle of the land wheel, and yieldingly held in substantially fixed relation with respect thereto by means of a curved brace bar 70 which connects with a sleeve 71 on the leg or standard of the land wheel axle.

The pivot 66 also serves as a mounting for a foot treadle 72 connected with a rod 73 which controls a latch adapted to engage with any one of a series of notches 74 in the edge of a segment 75, the arrangement being one which permits the latch to click over the notches when the lever 69 is being lowered and to mesh with the notches when the lever is swung in the opposite direction.

It will be noted that the leg or standard of the land wheel will be swung upwardly and forwardly in the operation of lowering the plow beams, and in order to facilitate this movement, a spring 75ª is provided which connects at its rear end with a link 76 pivoted to a crank arm 77 keyed to the land wheel axle, which crank arm at its upper end terminates in a tooth 78 best shown in Fig. 7 which bears against the under side of the bracket yoke 68, thereby exerting an tween the depending arms 21 and 22 which are free to move slightly upon the longitudinal pivot bolts 24 and 25 to accommodate these movements.

The arrangement is sufficiently flexible to permit of the necessary sidewise swaying or tilting movement of the trailing implement which are essential to the successful operation of the implement in rough ground, and at the same time sufficient rigidity is afforded to coördinate the entire structure into a self-contained unitary implement which is capable of reversal as well as advance, and is completely within the driver's control at all times.

The means afforded for lifting the plow beams enables the latter to be lifted completely above the ground, which is quite essential in order that the tractor may be reversed. Even though a rolling landside be employed, it would be pushed into the ground or against obstructions and would maintain a line of travel equalized by the land and furrow wheels which would be almost impossible to deviate from, should it be necessary to turn the tractor when reversing. By employing the limited movement of the hitch bars as described and holding the rear end of the implement above the ground, the land and furrow wheels of the plow become supporting and guiding wheels for the tractor in addition to their function as carrying wheels for the plow, under which conditions the tractor may be guided freely in turning either to the right or left, whether advancing or reversing, which facility of control is impossible where a trailing implement is hitched in the usual manner behind a self-contained tractor.

Furthermore, the points of ground contact in the present implement are less in number than in the case of a self-contained tractor with its trailing implement, since, in the latter case, the tractor itself must have at least three supporting wheels, and preferably four, whereas, in the case of the present invention but two wheels on the power unit are required, and even one, if of sufficient width, might conceivably be employed.

It will thus be seen that the present invention embodies means whereby the trailing implement has become a partially supporting and guiding element of a combined tractor and implement unit in which the tractor is free to perform its natural functions without being disturbed by the influence of the implement, and also in which the implement is free to perform its functions without in any way being disturbed by the action of the tractor through its connections. Even though there may be a horizontal variation between the tractor and the implement, or a vertical variation between the same, the connections are so provided as to accommodate these variations. Furthermore, it will be seen that, throughout the necessary adjustments of the implement with regard to the soil engaging elements, the horizontal alinement of the tractor has not been disturbed, and it will also be seen that means have been provided whereby the difficulty in providing for the lowering of the soil engaging elements into the ground has been overcome by simple mechanical means. It will, furthermore, be seen that but three connecting points are necessary, and that these may be quickly and easily disconnected in order to substitute implements of a different form for the one herein particularly described.

Although the invention, in its more limited aspect, is designed particularly for use in association with a plow of the general style before described, and, although in this association, the connections possess special and distinct advantages and combine with the implement itself in a peculiar and distinctive way, nevertheless it will be understood that, in its broadest aspect, the connections of the present invention are designed for use with implements other than plows or the like, and that in some of the appended claims, unless otherwise limited, it is the intention to cover such connections in association with any kind of an implement which is capable of being used in accordance with the principles of the present invention, and is adapted to function in whole or in part in the manner previously described.

I claim:

1. In an implement of the class described, the combination of an unstable power unit providing a forward point of ground contact, a beam connected at its forward end to the power unit and rearwardly extending therefrom, a trailing unit providing a rear point of ground contact, a draft connection between the trailing unit and the power unit below the level of the beam, and connections between the beam and trailing implement, consisting in part of a pivoted member adapted to permit of the vertical adjustment with respect to the ground level of those portions of the trailing unit with which said connections are attached without varying the level of the rearwardly extending beam, substantially as described.

2. In an implement of the class described, the combination of an unstable power unit providing a point of ground contact, a rearwardly extending beam connected to the power unit, a connecting element pivoted to the beam on a horizontal axis, a trailing unit affording an additional point of ground contact, pivoted connections between the trailing unit and the power unit and located below the level of the rearwardly extending beam, and a connection between the trailing unit and the horizontally pivoted connecting element designed to permit of variations in the vertical level of those portions of the trailing unit with which said connections are attached without imparting such variations to the rearward extending beam, substantially as described.

4. In an implement of the class described, the combination of an unstable power unit providing a point of ground contact, a rearwardly extending beam connected to the power unit, a connecting element pivoted to the beam on a horizontal axis, a trailing unit affording an additional point of ground contact, a pivoted connection between the trailing unit and the power unit and located below the level of the rearwardly extending beam, and connections between the trailing unit and the horizontally pivoted connecting element, consisting in part of a member connected at one end in pivotal relation to the connecting element and pivoted at its other end to a vertically adjustable portion of the trailing unit and designed to permit of variations in the vertical adjustment of the latter without imparting such variations to the rearwardly extending beam and the power unit, substantially as described.

4. In an implement of the class described, the combination of an unstable power unit providing a point of ground contact, a rearwardly extending beam connected to the power unit by means of a vertical pivot, a connecting element pivoted to the beam on a horizontal axis, a trailing unit affording an additional point of ground contact, a pivoted connection between the trailing unit and the power unit and located below the level of the rearwardly extending beam, a hanger depending from the horizontally pivoted connecting element, and a connecting bar pivoted at one end to the hanger and at its other end to the trailing unit to permit of variations in the level of the attached portions of the latter without imparting such variations to the rearwardly extending beam and to the power unit, substantially as described.

5. In an implement of the class described, the combination of an unstable power unit providing a point of ground contact, a rearwardly extending beam connected to the power unit by means of a vertical pivot, a connecting element pivoted to the beam on a horizontal axis, a trailing unit affording an aditional point of ground contact, a pivoted connection between the trailing unit and the power unit and located below the level of the rearwardly extending beam, connections between the trailing unit and the horizontally pivoted connecting element designed to permit of variations in the vertical level of the attached portions of the trailing unit without imparting such variations to the rearwardly extending beam, and a seat beam pivotally connected with respect to the connecting element at its forward end and positioned to provide an intermediate point of contact with the vertically adjustable portions of the trailing unit to exert a downward pressure thereon to assist in the lowering of said portion thereof, substantially as described.

6. In an implement of the class described, the combination of an unstable power unit providing a point of ground contact, a rearwardly extending beam connected to the power unit by means of a vertical pivot, a connecting element pivoted to the beam on a horizontal axis, a trailing unit affording an additional point of ground contact, a pivoted connection between the trailing unit and the power unit and located below the level of the rearwardly extending beam, connections between the trailing unit and the horizontally pivoted connecting element consisting in part of a member connected at one end in pivotal relation to the connecting element and pivoted at its other end to a vertically adjustable portion of the trailing unit to permit of variations in the vertical adjustment of the latter without imparting such variations to the rearwardly extending beam and the power unit, and a seat beam pivotally connected with respect to the connecting element at its forward end and positioned to provide an intermediate point of contact with the vertically adjustable portions of the trailing unit to exert a downward pressure thereon to assist in the lowering of said portions thereof, substantially as described.

7. In an implement of the class described, the combination of an unstable power unit providing a point of ground contact, a rearwardly extending beam connected to the power unit by means of a vertical pivot, a connecting element pivoted to the beam on a horizontal axis, a trailing unit affording an additional point of ground contact, a pivoted connection between the trailing unit and the power unit and located below the level of the rearwardly extending beam, a hanger depending from the horizontally pivoted connecting element, a connecting bar pivoted at one end to the hanger and at its other end to a vertically adjustable portion of the trailing unit to permit of variations in the level of the latter without imparting such variations to the rearwardly extending beam and to the power unit, and a seat beam pivotally connected with respect to the connecting element at its forward end and positioned to provide an intermediate point of contact with the vertically adjustable portions of the trailing unit to exert a downward pressure thereon to assist in the lowering of said portions thereof, substantially as described.

8. In an implement of the class described, the combination of an unstable power unit providing a point of ground contact, a rearwardly extending beam connected to the power unit by means of a vertical pivot, a connecting element pivoted to the beam on a horizontal axis, a trailing unit affording an additional point of ground contact, a pivoted connection between the trailing unit and the power unit and located below the level of the rearwardly extending beam, a connection between a vertically adjustable portion of the trailing unit and the horizontally pivoted connecting element designed to permit of variations in the vertical level of the vertically adjustable portions of the trailing unit without imparting such variations to the rearwardly extending beam, a seat beam pivotally connected with respect to the connecting element at its forward end and positioned to provide an intermediate point of contact with the vertically adjustable portions of the trailing unit to exert a downward pressure thereon to assist in the lowering of said portions thereof, and a stop carried by the connecting element for limiting the downward movement of the seat beam, substantially as described.

9. In an implement of the class described, the combination of an unstable power unit providing a point of ground contact, a rearwardly extending beam connected to the power unit by means of a vertical pivot, a connecting element pivoted to the beam on a horizontal axis, a trailing unit affording an additional point of ground contact, a pivoted draft connection between the trailing unit and the power unit and located below the level of the rearwardly extending beam, connections between the trailing unit and the horizontally pivoted connecting element consisting in part of a member connected at one end in pivotal relation to the connecting element and pivoted at its other end to a vertically adjustable portion of the trailing unit to permit of variations in the horizontal adjustment of the latter without imparting such variations to the rearwardly extending beam and the power unit, a seat bar pivotally connected with respect to the connecting element at its forward end and positioned to provide an intermediate point of contact with the vertically adjustable portions of the trailing unit to exert a downward pressure thereon to assist in the lowering of said portions thereof, and a stop carried by the connecting element for limiting the downward movement of the seat bar, substantially as described.

10. In an implement of the class described, the combination of an unstable power unit providing a point of ground contact, a rearwardly extending beam connected to the power unit by means of a vertical pivot, a connecting element pivoted to the beam on a horizontal axis, a trailing unit affording an additional point of ground contact, a pivoted draft connection between the trailing unit and the power unit and located below the level of the rearwardly extending beam, a hanger depending from the horizontally pivoted connecting element, a connecting bar pivoted at one end to the hanger and at its other end to a vertically adjustable portion of the trailing unit to permit of variations in the level of the latter without imparting such variations to the rearwardly extending beam and to the power unit, a seat bar pivotally connected with respect to the connecting element at its forward end and positioned to provide an intermediate point of contact with the vertically adjustable portions of the trailing unit to exert a downward pressure thereon to assist in the lowering of said portions thereof, and a stop carried by the connecting element for limiting the downward movement of the seat bar, substantially as described.

11. In an implement of the class described, the combination of an unstable power unit provided with a pair of ground wheels, a rearwardly extending beam connected at its forward end with the power unit by means of a vertical pivot, steering mechanism carried by the beam for swinging the same in a horizontal plane with respect to the power unit, a connecting element in the form of an elongated frame located in parallelism and below the beam and connected therewith by a horizontal pivot, a trailing unit provided with ground wheels adapted to support the trailing unit and the rear end of the power unit and permit the steering of the latter, a low-down draft connection between the trailing unit and the power unit pivoted to permit vertical and horizontal movements of the trailing unit, and a pivotal connection between the elongated frame and a vertically adjustable portion of the trailing unit adapted to permit vertical adjustment of the latter without varying the level of the rearwardly extending beam and the power unit, substantially as described.

12. In an implement of the class described, the combination of an unstable power unit provided with a pair of ground wheels, a rearwardly extending beam connected at its forward end with the power unit by means of a vertical pivot, steering mechanism carried by the beam for swinging the same on a horizontal axis with respect to the power unit, a connecting element in the form of an elongated frame located in parallelism and below the beam and connected therewith by a horizontal pivot, a trailing unit provided with ground wheels adapted to support the trailing unit and the rear end of the power unit and permit the steering of the latter, a low-down draft connection between the trailing unit and the power unit pivoted to permit vertical and horizontal movements of the trailing unit, a hanger depending from the elongated frame, and a connecting bar pivoted at one end to the hanger and at the other end to a vertically adjustable portion of the trailing unit to permit vertical adjustment of the latter without imparting such adjustment to the rearwardly extending beam and to the power unit, substantially as described.

13. In an implement of the class described, the combination of an unstable power unit provided with a pair of ground wheels, a rearwardly extending beam connected at its forward end with the power unit by means of a vertical pivot, steering mechanism carried by the beam for swinging the same on a horizontal axis with respect to the power unit, a connecting element in the form of an elongated frame located in parallelism and below the beam and connected therewith by a horizontal pivot, a trailing unit provided with ground wheels adapted to support the rear end of the power unit and permit the steering of the latter, a low-down draft connection between the trailing unit and the power unit pivoted to permit vertical and horizontal movements of the trailing unit, a hanger depending from the elongated frame, a connecting bar pivoted at one end to the hanger and at the other end to a vertically adjustable portion of the trailing unit to permit vertical adjustment of the latter without imparting such adjustment to the rearwardly extending beam, and a seat bar connected at its forward end in pivotal relation to the elongated frame and bearing at an intermediate point against the vertically adjustable portion of the trailing unit when raised to exert downward pressure thereon to facilitate the lowering of said portions of the trailing unit, substantially as described.

14. In an implement of the class described, the combination of an unstable power unit provided with a pair of ground wheels, a rearwardly extending beam connected at its forward end with the power unit by means of a vertical pivot, steering mechanism carried by the beam for swinging the same on a horizontal axis with respect to the power unit, a connecting element in the form of an elongated frame located in parallelism and below the beam and connected therewith by a horizontal pivot, a trailing unit provided with ground wheels adapted to support the rear end of the power unit and permit the steering of the latter, a low-down draft connection between the trailing unit and the power unit pivoted to permit vertical and horizontal movements of the trailing unit, a hanger depending from the elongated frame, a connecting bar pivoted at one end to the hanger and at the other end to a vertically adjustable portion of the trailing unit to permit vertical adjustment of the latter without imparting such adjustment to the rearwardly extending beam, a seat bar connected at its forward end in pivotal relation to the elongated frame and bearing at an intermediate point against the vertically adjustable portion of the trailing unit when raised to exert downward pressure thereon to facilitate in the lowering of the trailing unit, and a stirrup or the like hung from the elongated frame and adapted to limit the downward movement of the seat bar, substantially as described.

15. In an implement of the class described, the combination of an unstable power unit, a beam rearwardly extending from the power unit and pivoted thereto at its forward end on a vertical axis steering mechanism carried by the beam for angling the beam with respect to the power unit, a trailing unit connected to the beam, a low-down draft connection between the trailing unit and the power unit, said connection at its forward end being pivoted by a horizontal pivot to accommodate lateral movements of the trailing unit, and the connection being pivoted to the trailing unit by a horizontal pivot and being provided with stop means for allowing the last mentioned pivotal connection to break in an upward direction only, substantially as described.

16. In an implement of the class described, the combination of an unstable power unit, a beam rearwardly extending from the power unit and pivoted thereto at its forward end on a vertical axis, steering mechanism carried by the beam for angling the beam with respect to the power unit, a trailing unit connected to the beam by connections including a horizontal pivot, a low-down draft connection between the trailing unit and the power unit, said connection consisting of rearwardly diverging bars united at their forward ends and provided with stop members at their rear ends, a universal joint connection to which the forward end of the draft connection is secured, and horizontal pivot bolts entered through an intermediate portion of the rearwardly diverging bars for pivotally uniting the same to the trailing unit at a point in advance of the stop members for permitting the joint thus afforded to break in an upward direction only, substantially as described.

17. In an implement of the class described, the combination of an unstable power unit provided with a pair of ground wheels, a rearwardly extending beam pivoted to the power unit on a vertical axis at the forward end of the beam, a depending draft bar connected with the beam, a trailing unit, connections between the trailing unit and the rearwardly extending beam and designed to permit vertical adjustments of a portion of the trailing unit, a low-down draft connection for the trailing unit consisting of a pair of rearwardly diverging bars united at their forward ends and pivotally connected with the depending draft bar, and provided at their rear ends with lateral stop members, and horizontal pivotal connections between the diverging draft bars and the vertically adjustable portion of the trailing unit located in advance of the stop member and positioned to permit the joint thus afforded to break in one direction only, substantially as described.

18. In an implement of the class described, the combination of an unstable power unit provided with a pair of ground wheels, a rearwardly extending beam pivoted at its forward end to the power unit to swing on a vertical axis, a connecting element located below the beam and pivoted thereto on a horizontal axis, a trailing plow connected with the power unit by a low-down draft connection and provided with ground wheels and plow beams vertically adjustable with relation to the ground wheels and a connection between the plow and the connecting element so designed as to permit vertical adjustment of the plow beams without imparting vertical variations to the rearwardly extending beam and the power unit, substantially as described.

19. In an implement of the class described, the combination of an unstable power unit provided with a pair of ground wheels, a rearwardly extending beam pivoted at its forward end to the power unit to swing on a vertical axis, a connecting element located below the beam and pivoted thereto on a horizontal axis, a trailing plow connected with the power unit by a low-down draft connection and provided with adjustable ground wheels and plow beams, and a connection pivoted at one end to the vertically adjustable plow beams and at its other end connected in pivotal relation with the connecting element to permit the plow beams to be raised and lowered without imparting vertical movements to the rearwardly extending beam and to the power unit, substantially as described.

20. In an implement of the class described, the combination of an unstable power unit provided with a pair of ground wheels, a rearwardly extending beam pivoted at its forward end to the power unit to swing on a vertical axis, a connecting element located below the beam and pivoted thereto on a horizontal axis, a trailing plow connected with the power unit by a low-down draft connection and provided with adjustable ground wheels and vertically adjustable plow beams, a hanger depending from the connecting element, and a connecting bar pivoted at one end to the hanger and at the other end to the plow beams for permitting vertical adjustment of the latter without imparting vertical movement to the rearwardly extending beam and to the power unit, substantially as described.

21. In an implement of the class described, the combination of an unstable power unit provided with a pair of ground wheels, a rearwardly extending beam pivoted at its forward end to the power unit to swing on a vertical axis, a connecting element located below the beam and pivoted thereto on a horizontal axis, a trailing plow connected with the power unit by a low-down draft connection and provided with adjustable ground wheels and vertically adjustable plow beams, a connection between the plow and the connecting element so designed as to permit the ground wheels to be adjusted to raise and lower the plow beams without imparting vertical variations to the rearwardly extending beam and the power unit, and a seat bar connected at the forward end in pivotal relation to the connecting element, and adapted to impart a downward thrust to the plow beams when elevated to assist in the lowering of the plow beams, substantially as described.

22. In an implement of the class described, the combination of an unstable power unit provided with a pair of ground wheels, a rearwardly extending beam pivoted at its forward end to the power unit to swing on a vertical axis, a connecting element located below the beam and pivoted thereto on a horizontal axis, a trailing plow connected with the power unit by a low-down draft connection and provided with adjustable ground wheels and vertically adjustable plow beams, a connection pivoted at one end to the plow beams and at its other end connected in pivotal relation with the connecting element to permit the plow beams to be raised and lowered without imparting vertical movements to the rearwardly extending beam and to the power unit, and a seat bar connected at the forward end in pivotal relation to the connecting element, and adapted to impart a downward thrust to the plow beams when elevated to assist in the lowering of the plow beams, substantially as described.

23. In an implement of the class described, the combination of an unstable power unit provided with a pair of ground wheels, a rearwardly extending beam pivoted at its forward end to the power unit to swing on a vertical axis, a connecting element located below the beam and pivoted thereto on a horizontal axis, a trailing plow connected with the power unit by a low-down draft connection and provided with adjustable ground wheels and vertically adjustable plow beams, a hanger depending from the connecting element, a connecting bar pivoted at one end to the hanger and at the other end to the plow beams for permitting vertical adjustment of the latter without imparting vertical movement to the rearwardly extending beam and to the power unit, and a seat bar connected at the forward end in pivotal relation to the connecting element, and adapted to impart a downward thrust to the plow beams when elevated to assist in the lowering of the plow beams, substantially as described.

24. In an implement of the class described, the combination of an unstable power unit provided with a pair of ground wheels, a rearwardly extending beam pivoted at its forward end to the power unit to swing on a vertical axis, a connecting element located below the beam and pivoted thereto on a horizontal axis, a trailing plow connected with the power unit by a low-down draft connection and provided with adjustable ground wheels and vertically adjustable plow beams, connections between the plow and the connecting element so designed as to permit the ground wheels to be adjusted to raise and lower the plow beams without imparting vertical variations to the rearwardly extending beam and the power unit, a seat bar connected at the forward end in pivotal relation to the connecting element, and adapted to impart a downward thrust to the plow beams when elevated to assist in the lowering of the plow beams, and a stop member carried by the connecting element for limiting the downward movement of the seat bar, substantially as described.

25. In an implement of the class described, the combination of an unstable power unit provided with a pair of ground wheels, a rearwardly extending beam pivoted at its forward end to the power unit to swing on a vertical axis, a connecting element located below the beam and pivoted thereto on a horizontal axis, a trailing plow connected with the power unit by a low-down draft connection and provided with adjustable ground wheels and vertically adjustable plow beams, a connection pivoted at one end to the plow beams and at its other end connected in pivotal relation with the connecting element to permit the plow beams to be raised and lowered without imparting vertical movements to the rearwardly extending beam and to the power unit, a seat bar connected at the forward end in pivotal relation to the connecting element, and adapted to impart a downward thrust to the plow beams when elevated to assist in the lowering of the plow beams, and a stop member carried by the connecting element for limiting the downward movement of the seat bar, substantially as described.

26. In an implement of the class described, the combination of an unstable power unit provided with a pair of ground wheels, a rearwardly extending beam pivoted at its forward end to the power unit to swing on a vertical axis, a connecting element located below the beam and pivoted thereto on a horizontal axis, a trailing plow connected with the power unit by a low-down draft connection and provided with adjustable ground wheels and vertically adjustable plow beams, a hanger depending from the connecting element, a connecting bar pivoted at one end to the hanger and at the other end to the plow beams and designed to prevent vertical movement of the rearwardly extending beam and of the power unit, a seat bar connected at the forward end in pivotal relation to the connecting element, and adapted to impart a downward thrust to the plow beams when elevated to assist in the lowering of the plow beams, and a stop member carried by the connecting element for limiting the downward movement of the seat bar, substantially as described.

27. In an implement of the class described, the combination of an unstable power unit provided with a pair of ground wheels, a beam rearwardly extending from the power unit and connected therewith at its forward end by a vertical pivot, a connecting element in the form of an elongated frame pivoted to and below the beam on a horizontal axis, a hanger depending from the connecting element, a trailing implement in the form of a plow having adjustable ground wheels and vertically adjustable plow beams, an axle for one of the ground wheels journaled to the plow beams and provided with an angularly disposed leg or standard terminating in a spindle upon which the wheel is mounted, means for rocking the axle to change the angularity of the leg or standard, and thereby vary the vertical relation between the wheel and the plow beam, and a connecting bar mounted upon and rotatable with the axle pivoted at its forward end to the hanger and designed to permit variations in the vertical adjustments of the plow beams without subjecting the rearwardly extending beam to vertical movement, substantially as described.

28. In an implement of the class described, the combination of an unstable power unit provided with a pair of ground wheels, a beam rearwardly extending from the power unit and connected therewith at its forward end by a vertical pivot, a connecting element in the form of an elongated frame pivoted to and below the beam on a horizontal axis, a hanger depending from the connecting element, a trailing implement in the form of a plow having adjustable ground wheels and vertically adjustable plow beams, an axle for one of the ground wheels journaled to the plow beams and provided with an angularly disposed leg or standard terminating in a spindle upon which the wheel is mounted, means for rocking the axle to change the angularity of the leg or standard, and thereby vary the vertical relation between the wheel and the plow beams, a connecting bar mounted upon and rotatable with the axle pivoted at its forward end to the hanger and designed to permit variations in the vertical adjustments of the plow beams without subjecting the rearwardly extending beam to vertical movement, and a seat bar connected in pivotal relation at its forward end to the connecting element and adapted to bear downwardly against the wheel axle when the plow beams are in raised position for assisting in the lowering of the plow beams, substantially as described.

29. In an implement of the class described, the combination of an unstable power unit provided with a pair of ground wheels, a beam rearwardly extending from the power unit and connected therewith at its forward end by a vertical pivot, a connecting element in the form of an elongated frame pivoted to and below the beam on a horizontal axis, a hanger depending from the connecting element, a trailing implement in the form of a plow having adjustable ground wheels and vertically adjustable plow beams, an axle for one of the ground wheels journaled to the plow beams and provided with an angularly disposed leg or standard terminating in a spindle upon which the wheel is mounted, means for rocking the axle to change the angularity of the leg or standard, and thereby vary the vertical relation between the wheel and the plow beams, a connecting bar mounted upon and rotatable with the axle pivoted at its forward end to the hanger and designed to permit variations in the vertical adjustments of the plow beams without subjecting the rearwardly extending beam to vertical movement, a seat bar connected in pivotal relation at its forward end to the connecting element and adapted to bear downwardly against the wheel axle when the plow beams are in raised position for assisting in the lowering of the plow beams, and a stop member connected with the connecting element for limiting the downward movement of the seat bar, substantially as described.

30. In a vehicle of the class described, the combination of an unstable power unit providing a forward point of ground contact, a trailing unit providing a rear point of ground contact, a portion of the trailing unit being vertically adjustable, and compensating connections between the two units connected at their forward end in fixed vertical relation to the power unit and connected at their rearward end to the vertically adjustable portion of the trailing unit, and adapted to provide for said vertical adjustments without disturbing the horizontal balance of the power unit, substantially as described.

HARRY S. DICKINSON.

Witnesses:
S. C. BLANDING,
JAMES J. LAMB.